United States Patent [19]

Duncan et al.

[11] Patent Number: 4,848,169
[45] Date of Patent: Jul. 18, 1989

[54] TWO AXIS RATE GYRO APPARATUS

[75] Inventors: Damon H. Duncan; Randy P. Goettsche, both of Phoenix, Ariz.

[73] Assignee: Honeywell, Inc., Minneapolis, Minn.

[21] Appl. No.: 53,889

[22] Filed: May 22, 1987

[51] Int. Cl.⁴ .................. G01C 19/22; G01C 19/28
[52] U.S. Cl. .................................. 74/5 F; 74/5.6 E
[58] Field of Search .............. 74/5.6 D, 5.6 E, 5.6 A, 74/5.6 R, 5 F

[56] References Cited

U.S. PATENT DOCUMENTS

| | | | |
|---|---|---|---|
| 3,540,289 | 11/1970 | Ivers | 74/5.6 E X |
| 4,259,871 | 4/1981 | Kerhoas et al. | 74/5.6 E X |
| 4,386,535 | 6/1983 | Albert | 74/5.6 D |

Primary Examiner—Rodney H. Bonck
Attorney, Agent, or Firm—Howard Paul Terry

[57] ABSTRACT

A two-degree of freedom, open loop, spring restrained rate gyro apparatus includes a motor mounted in a housing with a conductive device provided for conducting operating voltages into and out of the housing. A shaft is rotatably mounted in the housing and is connected to be driven by the motor. A ring, having a hub, is connected to the shaft. The ring and hub are interconnected by a torsion bar. A stop is connected to the shaft adjacent the ring so as to define an air gap between the ring and the stop. A pair of variable reluctance pickoffs are mounted in the housing adjacent the ring. The pickoffs also define an air gap between each of the pickoffs and the ring. An optical pickoff is also mounted adjacent the ring. A signal processor is connected to the pair of variable reluctance pickoffs and to the optical pickoff for measuring the rate of the gyro.

8 Claims, 5 Drawing Sheets

TWO AXIS RATE GYRO APPARATUS

BACKGROUND OF THE INVENTION

1. Field of the Invention

This invention relates generally to gyroscopes such as two axis gyroscopes and more particularly to spring restrained, open loop, two axis, rate gyroscopes.

2. Background of the Invention

The common usage of gyroscopes in inertial guidance systems demands accuracy. Increasingly, there is a demand for gyroscopes with low cost for these systems. This invention describes a gyroscope that has accuracy at a cost level that has been previously unattained.

Briefly, the open loop gyroscope described below are low cost devices that have relatively low accuracy. Their primary limitation being temperature induced errors. The closed loop devices described below are highly accurate, but are complex and costly.

Pertinent examples of prior art, open loop, two-axis gyroscopes, or gyros, are exemplified by U.S. Pat. Nos. 3,323,377 and 3,998,105. These gyros utilize a thin flexible disk, mounted on the end of a shaft, spun at relatively high rotational velocities by a spin motor. Rotation of the gyro housing results in an angular deflection of the disk that is proportional to the rate of rotation. Suitable electrical transducers supported on the gyro housing provide electrical signals proportional to the input angular rates. The angle between the disk and the transducers is substantially dependent on input angular rate; however, a primary limitation is that differences in thermal growth between transducers appear the same as input angular rates. Thermal growth is defined as the increase in length of a part due to a rise in temperature of the part.

Pertinent examples of prior art, closed loop, two axis gyros may be found in U.K. Pat. No. 599,826 and in U.S. Pat. Nos. 3,367,194 and 3,463,106. These patents demonstrate various techniques for restraining the rotor of a two-axis "free-rotor" gyro by using shaft mounted (rotating) pickoff and torquer arrangements. The rotor inertia, suspension angular stiffness, and a rotor speed of these gyros are selected to achieve "dynamic tuning" such that the natural frequency of the rotor coincides with the rotor spin speed. The pick-off senses any angular displacement of the rotor relative to the shaft and produces a signal that is used to control the torquer and continuously force the rotor back to its null position. The amount of torquer current needed becomes a measure of the gyro case input angular rate.

These closed loop techniques are limited by slip rings used to transfer signals to/from the rotor which are prone to noise and early wear out and rotary transformers used produce rate errors due to core eccentricity, mechanical misalignment, winding non-uniformity, and other magnetic anomalies. Also, the cost of these gyros are high due to the relatively compelx mechanical and electrical aspects.

The present invention avoids the problems to the closed loop type prior art gyro by using housing-mounted pickoff units and by eliminating torquer units. The present inventin avoids the problem of differences in thermal growth of pickoff units in the open loop type of prior art gyro by using a single pair of pickoff units, equally spaced about a single pickoff axis, in combination with a rotor position sensor, and in combination with a signal processor, which receives signals from the two pickoff units and the rotor position sensor, to measure the actual rate about any axis which is in the plane that passes through the pickoff axis and that is normal to the spin axis, and which cancels out the effect of difference in thermal growth of the pickoff units, particularly at the start-up condition.

SUMMARY OF THE INVENTION

In one aspect of the present invention, there is provided a gyroscope including, a housing having a motor having a shaft with a spin axis and having an X-axis and Y-axis in quadrature with the spin axis; a rotor supported by the shaft and having a ring having torsion bars with a torsion axis, a pair of pickoffs mounted on the housing and disposed along the X-axis for measuring the tilt angle of the ring about the Y-axis; a position sensor mounted on the housing for measuring the angle of rotation of the torsion axis about the Z-axis; and a signal processor for extracting the angle of tilt versus the angle of rotation for providing the angular rate about the X-axis and the angular rate about the Y-axis.

The foregoing and other aspects will become apparent from the following detailed description of the invention when considered in conjunction with the accompanying drawing. It is to be expressly understood, however, that the drawing is not intended as a definition of the invention but is for the purpose of illustration only.

DESCRIPTION OF THE PREFERRED EMBODIMENT

Figure 1:
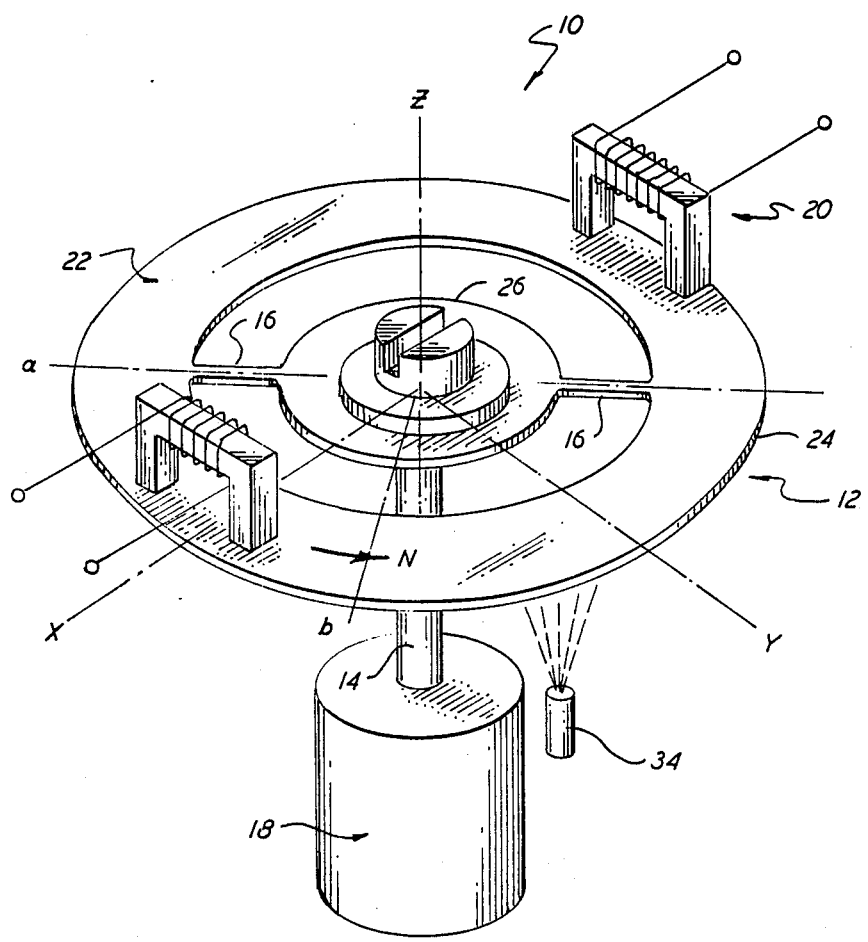
FIG. 1 is a a perspective view diagrammatically illustrating a functional view of some of the elemental parts of the embodiment of this invention.
Figure 2:
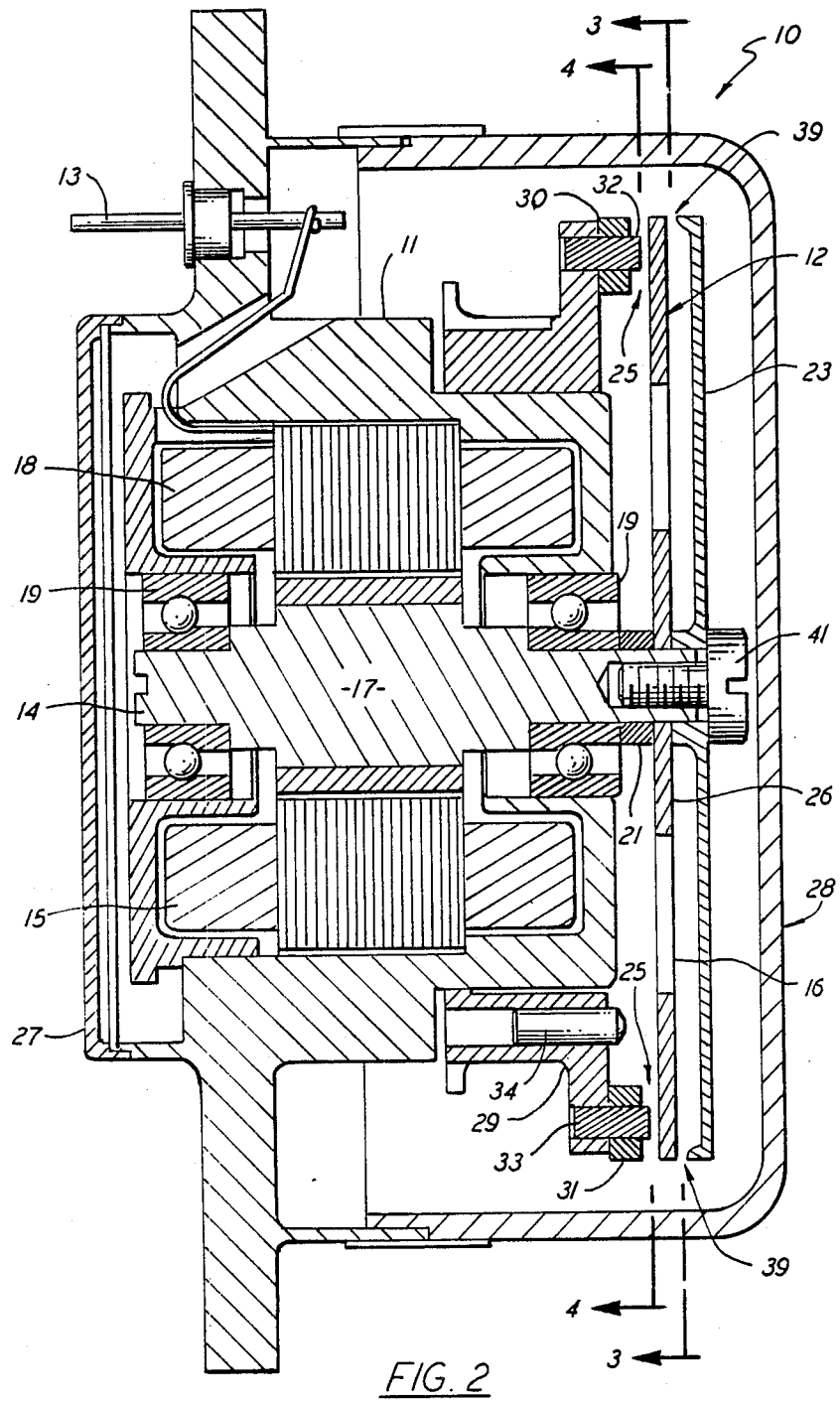
FIG. 2 is a cross-sectional view illustrating a structural embodiment of this invention.

The gyro apparatus of this invention is illustrated in FIG. 1 and FIG. 2 and is generally designated 10. Gyro 10 is a two-degree of freedom, open loop, spring restrained rate gyro that utilizes a rotor 12, comprised of a rigid ring 24 interconnected to a shaft 14 via torsion bars 16 and rigid hub 26. Bar 16 permits relative motion between 24 and shaft 14 about a single axis (torsional axis) designated a. A motor 18 is a synchronous hysteresis type.

Gyro 10 comprises generally a sensor housing 11 adapted to be rigidly mounted on an associated vehicle. The rates of rotation of housing 11 about axes X and Y are to be measured. Suitable covers 27, 28 are heremetically sealed to housing 11 which is evacuated and then backfilled with a suitable damping medium such as helium. Electrical terminals 13 are hermetically sealed to the housing 11 to conduct operating voltages into and out of housing 11. Fixedly secured within the housing 11 is the stator 15 of electric spin motor 18, a rotor 17 of motor 28 being mounted in suitable spin bearings 19, for rotation about axis Z. Motor rotor 17 includes internal shaft 14. One end of rotor shaft 14 extends axially beyond the housing 11 and is internally threaded to receive a rotor clamping screw 41. Gyro rotor 12 is clamped to the need of rotor shaft 14 by means of clamping screw 41, a washer 21, and a rotor stop 23. Small (approximately 0.005 inch) air gaps 39, defined between rotor 12 and stop 23, permit limited freedom of ring 24. As shown in FIG. 1, X, Y and Z are the housing fixed, orthogonal axes; and a, b and c are the rotor fixed, orthogonal axes.

Figure 3:
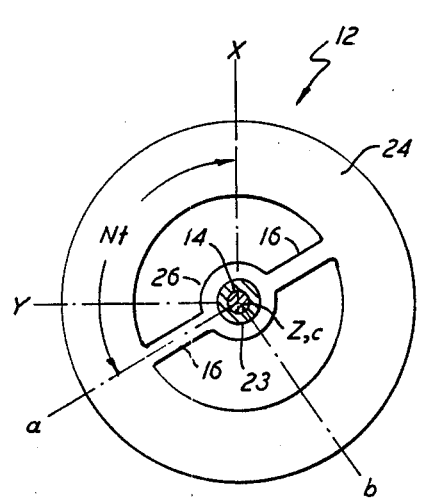
FIG. 3 is a view taken along the line 3—3 of FIG. 2.

Referring to FIG. 3, gyro rotor 12 comprises a thin, rigid ring 24 affixed to a rigid hub 26 by torsion bars 16. In the preferred embodiment, gyro rotor 12 is about 1.650 inches in diameter and about 0.031 inches thick; conventional mechanical and electrical machining techniques are used to produce the monolithic part. Gyro rotor 12 is constructed from a material having suitable flexural and magnetic qualities such as, for example, AISI B1112 steel.

Figure 4:
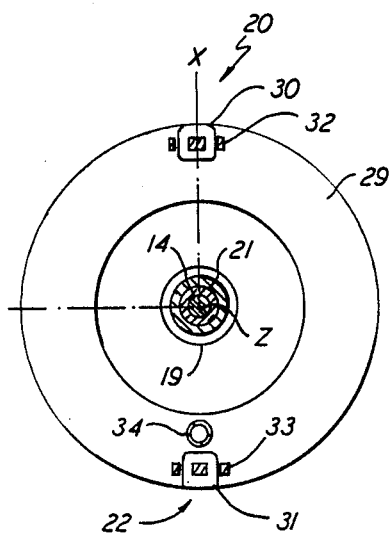
FIG. 4 is a view taken along the line 4—4 of FIG. 2.

Precession of gyro rotor 12 about the Y axis is detected by pickoffs 20, 22 mounted on a support frame 29 and located adjacent to the periphery of gyro rotor 12 at diametrically opposed sides thereof along axis X of FIG. 4. Each pickoff 20, 22 comprises a coil bobbin 30, 31 mounted on a respective permeable core member 32, 33. Thus, when gyro rotor 12 precesses in response to a turn rate, the airgaps 25, defined between pickoff cores 32, 33, and gyro rotor 12, change producing a resultant output of the differentially connected coils 30, 31 proportional to said gap change. An optic pickoff 34 cooperates with gyro rotor 12 to produce a square wave, twice spin frequency ($2 \times N$) signal for use as a reference for a pair of pickoff signal sin/cos demodulators, see FIG. 5.

A better understanding of the operation of the device may be obtained from the following mathematical analysis. The basic differential equation may be found from Euler's equation for the motion of a rigid body (in body-fixed reference coordinates) about a fixed point:

$$T_a = A\dot{\omega}_a + (C-B)\omega_b\omega_c$$

and from the equation for the torques due to damping and the spring rates of torsion bars 16.

$$T_a = -K\theta - D\dot{\theta}$$

where: the a, b, c set is fixed in gyro rotor 12; A, B are the transverse moments of inertia of gyro rotor 12 about the a, b axes respectively; C is the polar moment of inertia of gyro 12 about the c axis; K is the angular spring rate of the torsion bars 27, 28 about their common axis a; D is the angular damping constant about axis a; and $\omega_a$, $\omega_b$, $\omega_c$ are the absolute angular rates about the a, b, c axes, respectively.

Equating the two equations:

$$A\dot{\omega}_a + (C-B)\omega_b\omega_c = -K\theta - D\dot{\theta}$$

Noting that $\omega_a = \dot{\theta} + \dot{\phi}_x \cos(Nt) + \dot{\phi}_y \sin(Nt)$
$\dot{\omega}_a = \ddot{\theta} + \ddot{\phi}_x \cos(Nt) - N\dot{\phi}_x \sin(Nt) + \ddot{\phi}_y \sin(Nt) + N\dot{\phi}_y \cos(Nt)$
$\omega_b = N\theta - \dot{\phi}_x \sin(Nt) + \dot{\phi}_y \cos(Nt)$
$\omega_c = N$ The following differential equation is obtained:

$$\ddot{\theta} + \frac{D\dot{\theta}}{A} + \frac{[K + N^2(C-B)]\theta}{A} = \left[\frac{CN}{A}\dot{\phi}_X - \ddot{\phi}_Y\right]\sin(Nt) - \left[\frac{CN}{A}\dot{\phi}_Y - \ddot{\phi}_X\right]\cos(Nt)$$

where $\dot{\phi}_X$ = the angular rate of shaft 14 about housing fixed axis, X;

$\dot{\phi}_Y$ is the angular rate of shaft 14 about housing fixed axis, Y; and N is the angular rate of shaft 14 and rotor 12 about the spin axis Z.

For the case where damping is small and the angular rates are constant, it may be shown that $$\theta = \frac{CN(\dot{\phi}_X \sin(Nt) - \dot{\phi}_Y \cos(Nt))}{A(\omega_n - N^2)}$$

where the natural frequency $\omega_n$ is defined by $$\omega_n = \sqrt{\frac{K + N^2(C-B)}{A}}$$

It should be noted that in the last three references cited, the gyros are tuned such that $\omega_n = N$.

To those familiar with the art, this tuning makes gyro 10 behave as a free (displacement) gyro for a small amount of the total rotor displacement. Thus, a torquer must be used continuously to maintain the a, b plane of gyro rotor 12 perpendicular to the bearing spin axis (closed-loop operation) otherwise relatively small rates are sufficient to precess the rotor into stops 23.

In the preferred low cost embodiment, we desire open-loop operation; therefore, we select the gyro parameters such that $$\omega_n = \sqrt{\frac{K + N^2(C-B)}{A}} = N + 2\pi\lambda$$

where $\lambda$ (approximately 70 Hz) represents the frequency of a sinusoidal input rate required to excite the natural frequency of gyro 10 when it is operating at a spin speed, N. In this mode of operation, relatively large angular rates (>100°/sec) can be applied before gyro rotor 12 strikes stops 23.

Resolving the rotor motion $\theta$ (about the shaft-fixed, rotating coordinate set) onto the housing-fixed Y axis (pick-off axis), it can be shown that the response is:

$$\theta_Y = \frac{CN}{2A(\omega_n^2 - N^2)}[\dot{\phi}_X(1 - \cos(2Nt)) - \dot{\phi}_Y \sin(2Nt)]$$

By rejecting the DC term and by using two-phase-sensitive, sin/cos demodulators, the $\dot{\phi}_x$ and $\dot{\phi}_y$ rates (about two orthogonal axes) can be measured simultaneously by a single pickoff. The reference for these demodulators are derived from rotor position pickoff 34. In the above formula, C, N, A, $\omega_n$ and N are constants due to the parameters of gyro 10, as set in the design of the embodiment.

Figure 5:
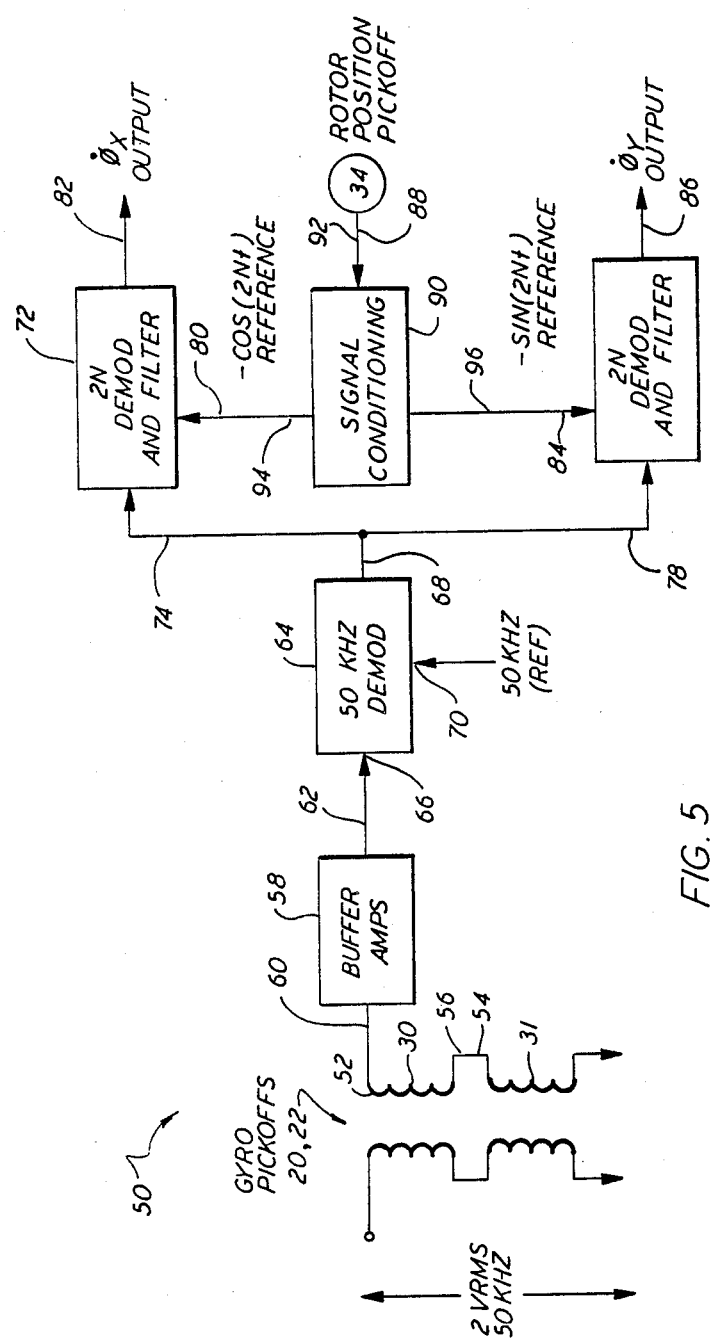
FIG. 5 is a diagrammatic view of the signal processing portion of the embodiment of this invention.

As shown in FIG. 5, gyro 10 also has a signal processor 50, which is provided for processing the signals from first coil 30 and second coil 31. First coil 30 has an output 52 and second coil 31 has an output 54. First coil 30 has an input 56 connected to output 54 of second coil 31.

Signal processor 50 has a buffer unit 58, which has an input 60 connected to output 52 of first coil 30. Buffer unit 58 has an output 62. Signal processor 50 also has a demodulator unit 64, which has an input 66 connected to output 62 of buffer unit 58. Demodulator unit 64 has an output 68 and has an input 70 through which is supplied a 50 kHz reference.

Signal processor 50 also has a first demodulator and filter unit 72 having a first input 74, which is connected to output 68 of demodulator unit 64.

Signal processor 50 also has a second demodulator and filter unit 76 having a first input 78, which is connected to output 68 of demodulator unit 64.

First demodulator and filter unit 72 has a second input 80 and an output 82. Second demodulator and filter unit 76 has a second input 84 and an output 86.

Signal processor 50 is connected to the third pickoff unit, or rotor position is pickoff 34, which has an output 88.

Signal processor 50 also has a signal conditioning unit 90 which has an input 92 connected to output 88 of rotor position pickoff unit 34. Signal conditioning unit 90 has a first output 94 connected to second input 80 of the first demodulator and filter unit 72. Signal conditioning unit 90 also has a second output 96 connected to second input 84 of the second demodulator and filter unit 76.

Output 82 furnishes the signal representing the rate $\dot{\phi}_X$ about the X-axis; and output 86 furnishes the signal representing the rate $\dot{\phi}_Y$ about the Y-axis, as shown heretofore in the last specified formula.

Figure 6:
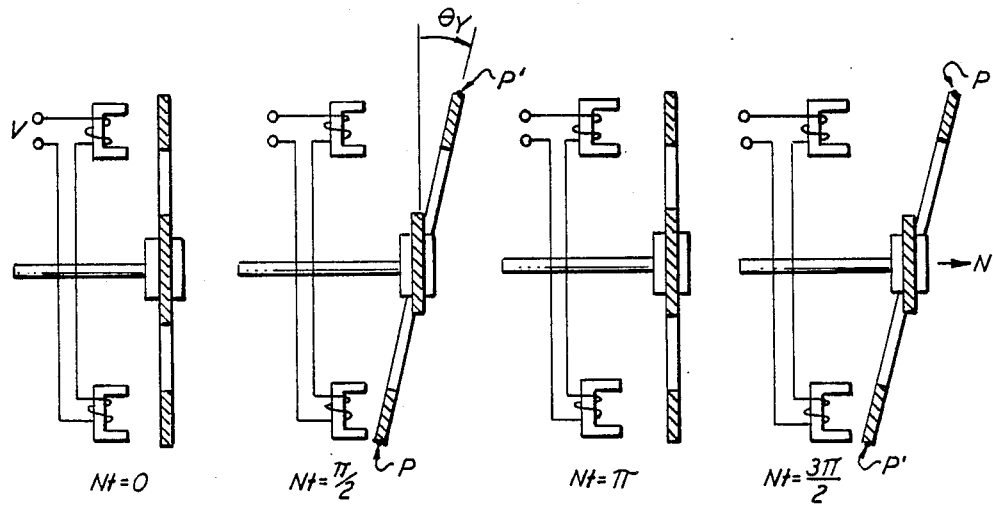
FIG. 6 is a sequence of side views showing four positions of the ring 24.

FIG. 6 shows the ring 24 in side view in four positions, which are ninety degrees apart about the spin axis Z. For reference, a point P on ring 24 is shown one hundred eighty degrees away from a point P' on the ring 24. Ring 24 deflects through an angle about the Y-axis $\theta_Y$, when point P is at angular positions $-\pi/2$ and $\pi/2$ and $3\pi/2$. Such deflection of ring 24 during rotation, when a rate about the X-axis $\dot{\phi}_X$ is applied is shown in FIG. 6.

Figure 7A:
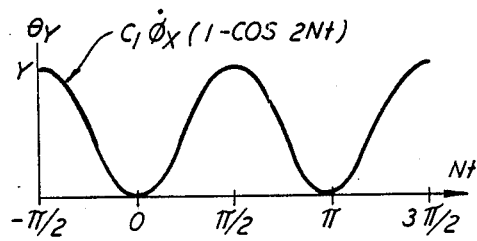
FIGS. 7A, B, C and D and 8A, B, C, and D show the curves of the signals in in a portion of the embodiment.

FIG. 7A shows the curve of deflection of $\theta_Y$, which equals $C_1 \dot{\phi}_X(1-\cos 2Nt)$ when $\dot{\phi}_Y=0$. In FIG. 7A, the vertical ordinates is $\theta_Y$ and the horizontal ordinate is Nt, which is the spin speed N multiplied by time t.

Figure 7B:
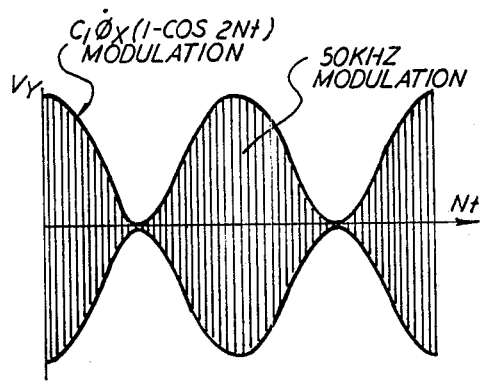

FIG. 7B shows the curve of voltage at 2Nt and 50 kHz modulation. In FIG. 7B, the vertical ordinate is the voltage $V_Y$ and the horizontal ordinate is Nt.

Figure 7C:
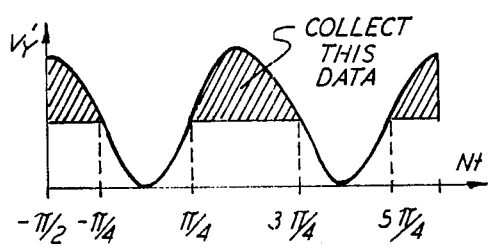

FIG. 7C shows the curve of volate $V_Y'$ on the vertical ordinate and shows Nt on the horizontal ordinate. Signal processor 50 collects the data in the cross-hatched areas under the curve of FIG. 7C.

Figure 7D:
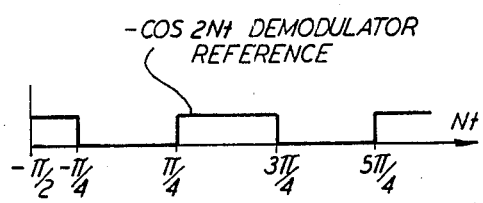

FIG. 7D shows the curve of the $(-\cos 2Nt)$ demodulator reference signal in the vertical ordinate versus Nt in the horizontal ordinate. The $-\cos 2Nt$ demodulator reference signal is provided by position sensor pickoff 34 in cooperation with the rotor 12 and signal conditioning 90, as shown in FIG. 5. In FIG. 7D, the rise and fall of the signal curve corresponds to the end point of the crosshatched areas in FIG. 7C.

Figure 8A:
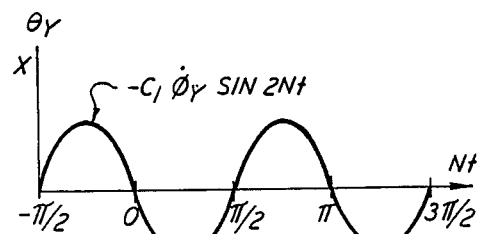

FIG. 8A shows the curve of deflection of $\theta_Y$, which equals $-C_1 \dot{\phi}_Y \sin 2Nt$ when $\dot{\phi}_X=0$. In FIG. 8A, the vertical ordinate is $\theta_Y$ and the horizontal ordinate is Nt which is the spin speed N multiplied by time t.

Figure 8B:
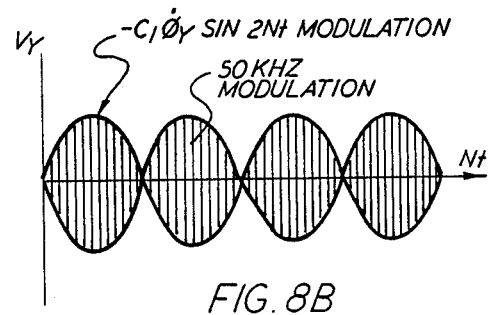

FIG. 8B shows the curve of voltage $V_Y$ in the vertical ordinate and Nt in the horizontal oridnate.

Figure 8C:
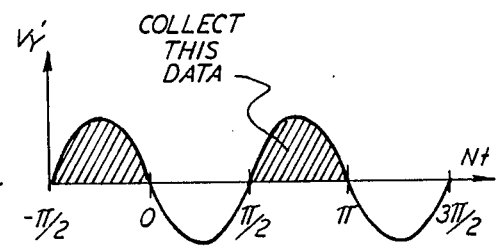

FIG. 8C shows the curve of voltage $V_Y'$ in the vertical ordinate and shows Nt in the horizontal ordinate. Signal processor 50 collects the data in the cross-hatched areas under the curve of FIG. 8C.

Figure 8D:
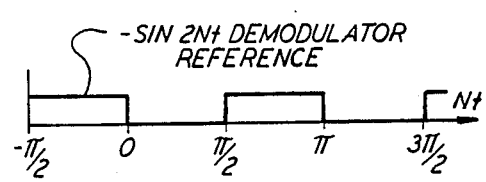

FIG. 8D shows the curve of the $(-\sin 2Nt)$ demodulator reference signal in the vertical ordinate versus Nt in the horizontal ordinate. The $-\sin 2Nt$ demodulator reference signal is provided by position sensor pickoff 34 in cooperation with the rotor 12 and signal conditioning 90, as shown in FIG. 5. In FIG. 8D, the rise and fall of the signal curve corresponds to the end points of the cross-hatched areas in FIG. 8C.

As shown in FIG. 7A, the motion of ring 24 about the Y-axis for an X-axis rate is the curve of $C_1 \dot{\phi}_X(1-\cos 2Nt)$. As shown in FIG. 8A, the motion of ring 24 about the Y-axis for an Y-axis rate is $-C_1 \dot{\phi}_X \sin 2Nt$.

As shown in FIG. 5, the signal is demodulated twice. To obtain the rate about the X-axis $\dot{\phi}_X$ by measuring the angle about the Y-axis $\theta_Y$, signal processor 50 uses a demodulated and filtered operation on output 68, so that the sin 2Nt is rejected, and the D.C. output of the gyro is rejected, and the wheel wobble Nt (not shown) is rejected.

As shown in FIG. 5, to obtain the rate about the Y-axis $\dot{\phi}_Y$ by measuring the angle about the Y-axis $\theta_Y$, signal processor 50 uses a demodulated and filter operation on output 68 so that $C_1(1-\cos 2Nt)$ is rejected, and the D.C. output of the gyro is rejected, and the wheel wobble Nt (not shown) is rejected.

The foregoing has described a two-axis rate gyro apparatus having a rotor 12 which, when spun at a high speed about the spin axis Z of its shaft 14, resists changes in attitude due to its angular momentum (i.e. its preferred orientation is in a plane perpendicular to the spin vector N). If subjected to an angular rate, however, a coriolis acceleration is produced which deflects rotor 12 from its preferred plane of operation. The resulant motion of the rotor relative to fixed pickoffs 20, 22 is a sinusoidal angular oscillation at twice the spin frequency (2N). The amplitude of oscillation is proportional to the magnitude of the applied angular rate.

Gyro 10 uses one set of pickoffs, in place of two sets of pickoffs in the prior art gyro, to measure the input rate about the X-axis and the input rate about the Y-axis, so that the cost of manufacture is minimized.

In summary, the invention lends itself to low cost construction and obviates the need for slip rings and/or rotary transformers to transfer signals to/from the rotating elements. In addition since the output signal is sinusoidal, thermally induced rotor/pickoff gap changes are not manifested as gyro errors, thereby improving accuracy.

While the invention has been described in its preferred embodiments, it is to be understood that the words which have been used are words of description rather than limitation and that changes may be made within the purview of the appended claims without departing from the true scope and spirit of the invention in its broader aspects.

The embodiments of an invention in which an exclusive property or right is claimed are defined as follows:

1. A gyroscope comprising:
    a motor having a shaft with a spin axis;
    a housing fixedly connected to the motor, said housing having an X-axis and a Y-axis, said X-axis and said Y-axis being disposed normal to each other and disposed in a plane normal to the spin axis;

a rotor supported by the shaft, said rotor having a ring portion rotatable about the spin axis, said ring portion being adapted to oscillate relative to the X-axis during rotation of the ring portion due to an angular rate applied to the housing about any sensing axis disposed normal to the spin axis in the plane of the X-axis and the Y-axis;

first and second pickoff units supported by the housing and axially spaced along the X-axis, said first and second pickoff units being separated from said ring portion by respective first and second air gaps, for measuring an angle of tilt of the ring portion relative to the pickoff units;

a position sensor unit supported by the housing and facing the ring portion, for measuring an angle of rotation of a reference axis of the ring portion relative to the X-axis; and a signal processor including first and second demodulation and filter means, each said demodulation and filter means having first and second inputs respectively connected to the first and second pickoff units and connected to the position sensor unit, for measuring the angular rate of the housing about the X-axis and the angular rate of the housing about the Y-axis.

2. A gyroscope comprising:

a motor having a shaft with a spin axis;

a housing fixedly connected to the motor, said housing having an X-axis and a Y-axis, said X-axis and said Y-axis being disposed normal to each other and disposed in a plane normal to the spin axis;

a rotor supported by the shaft, said rotor having a ring portion rotatable about the spin axis, said ring portion being adapted to oscillate relative to the X-axis during rotation of the ring portion due to an angular rate applied to the housing about any sensing axis disposed normal to the spin axis in the plane of the X-axis and the Y-axis;

first and second pickoff units supported by the housing and axially spaced along the X-axis, said first and second pickoff units being separated from said ring portion by respective first and second air gaps, for measuring an angle of tilt of the ring portion relative to the pickoff units;

a position sensor unit supported by the housing and facing the ring portion, for measuring an angle of rotation of a reference axis of the ring portion relative to the X-axis; and a signal processor connected to the first and second pickoff units and connected to the position sensor unit, for measuring the angular rate of the housing about the X-axis and the angular rate of the housing about the Y-axis; wherein said first pickoff unit includes a first coil with an output, and said second pickoff unit includes a second coil with an output, said first coil having an input connected to the output of the second coil, and said signal processor includes a buffer unit having an input connected to the output of the first coil and having an output, said signal processor includes a demodulator unit having an input connected to the output of the buffer unit and having an output, and said signal processor includes a first demodulator and filter unit having a first input connected to the output of the demodulator unit, and said signal processor includes a second demodulator and filter unit having a first input connected to said output of the demodulator unit, and said first demodulator and filter unit has a second inut and an output, and said second demodulator and filter unit has a second input and an output, and said signal processor is connected to the position sensor unit having an output, and said signal processor includes a signal conditioning unit having an input connected to the output of the position sensor unit, and said signal conditioning unit has a first output connected to the second input of the first demodulator and filter unit, and said signal conditioning unit has a second output connected to the second input of the second demodulator and filter unit.

3. A gyroscope according to claim 2, wherein said rotor has a pair of torsion bars axially spaced along a torsional axis, and said ring portion is supported by said torsion bars, and said rotor has a hub portion supported by the shaft for supporting the torsion bars.

4. A gyroscope according to claim 2, wherein said first pickoff unit includes a first core member and said first coil, said second pickoff unit includes a second core member and said second coil, and said position sensor unit is an optical sensor unit.

5. The gyroscope according to claim 2, wherein said first and second pickoff units are diametrically opposed and equally spaced from the Y-axis, and wherein said first and second pickoff units are disposed adjacent to a first side of said ring portion; and including a stop member connected to said shaft and being separated from said ring portion by an air gap, said stop member being disposed adjacent to a second side of said ring portion, said second side being opposite to said first side.

6. A gyroscope comprising:

a housing having a shaft with a spin axis; said housing having an X-aixs and a Y-axis disposed normal to each other in a plane normal to the spin axis;

a ring portion having a torsion bar for providing a tilt angle about a torsion axis and being supported by the shaft, said ring portion having a planar face;

at least one pickoff unit supported by the housing, said pickoff unit being separated from said ring portion face by an air gap.

a position sensor unit supported by the housing, said position sensor unit being adapted to measure the angle of rotation of the torsion axis relative to the Z-axis, and a signal processor including a first and second demodulation and filter means, each said demodulation and filter means having first and second inputs respective connected to said pickoff unit and to said position sensor unit, for measuring a tilt angle about the Y-axis relative to the rotation angle of the torsion axis, and for extracting therefrom the rate about the X-axis and the rate about the Y-axis.

7. A gyroscope comprising:

a housing having a shaft with a spin axis, said housing having an X-axis and a Y-axis disposed normal to each other in a plane normal to the spin axis;

a ring portion having a torsion bar for providing a tilt angle about a tonsion axis and being supported by the shaft, said ring portion having a planar planar face;

at least one pickoff unit supported by the housing, said pickoff unit being separated from said ring portion face by an air gap;

a position sensor unit supported by the housing, said position sensor unit being adapted to measure the angle of rotation of the torsion axis relative to the Z-axis, and a signal processor connected to said pickoff unit and to said position sensor unit, for measuring a tilt angle about the Y-axis relative to the rotation angle of the torsion axis, and for extracting therefrom the rate about the X-axis and the rate about the Y-axis; wherein the function of the tilt angle about the Y-axis ($\theta_Y$) relative to the input rate about the X-axis ($\dot{\phi}_X$) and relative to the input rate about the Y-axis ($\dot{\phi}_Y$) is neglecting damping, according to the following formula:

$$\theta_Y = \frac{CN}{2A(\omega_n^2 - N^2)} [\dot{\phi}_X(1 - \cos(2Nt)) - \dot{\phi}_Y \sin(2Nt)]$$

where:

A and C are constants;

N = a constant equal to the angular speed of shaft 14 and rotor 12 about spin axis Z; and $\omega_n$ = a constant equal to the natural frequency of the gyro 10 at the angular speed N of shaft 14.

8. A gyroscope comprising a housing having a motor having a shaft with a spin axis, said housing having an X-axis and Y-axis in quadrature with the spin axis;

a rotor having a ring having torsion bars with a torsion axis and being supported by the shaft;

a pair of pickoff units mounted on the housing and disposed on the X-axis and being equally spaced from the Y-axis for measuring the angle of tilt of the ring about the Y-axis;

a position sensor mounted on the housing for measuring the angle of rotation of the torsion axis about the Z-axis; and a signal processor including first and second demodulation and filter means, each said demodulation and filter means having first and second inputs respectively connected to the pair of pickoff units and to the position sensor, for extracting the angle of tilt of the ring versus the angle of rotation of the torsion axis, and for extracting the angular rate about the X-axis and the angular rate about the Y-axis therefrom.

* * * * *